(12) United States Patent
Hemstock

(10) Patent No.: US 10,807,020 B2
(45) Date of Patent: Oct. 20, 2020

(54) METHOD AND APPARATUS USING CLOSELY SPACED PLATES TO SEPARATE FLUIDS HAVING DIFFERENT RHEOLOGICAL PROPERTIES

(71) Applicant: SPECIALIZED DESANDERS INC., Calgary (CA)

(72) Inventor: Christopher A. Hemstock, Calgary (CA)

(73) Assignee: SPECIALIZED DESANDERS INC., Calgary (CA)

(*) Notice: Subject to any disclaimer, the term of this patent is extended or adjusted under 35 U.S.C. 154(b) by 294 days.

(21) Appl. No.: 16/027,577

(22) Filed: Jul. 5, 2018

(65) Prior Publication Data

US 2018/0345177 A1    Dec. 6, 2018

Related U.S. Application Data

(63) Continuation-in-part of application No. 15/991,771, filed on May 29, 2018.

(Continued)

(51) Int. Cl.
| | | |
|---|---|---|
| *B01D 21/00* | (2006.01) | |
| *B01D 17/02* | (2006.01) | |
| *B01D 19/00* | (2006.01) | |
| *B01D 29/46* | (2006.01) | |
| *B01D 45/02* | (2006.01) | |

(Continued)

(52) U.S. Cl.
CPC ........ *B01D 21/0045* (2013.01); *B01D 17/02* (2013.01); *B01D 17/0211* (2013.01); *F15D 1/14* (2013.01); *B01D 2221/04* (2013.01); *E21B 43/34* (2013.01)

(58) Field of Classification Search
CPC .............. B01D 2221/04; B01D 17/02; B01D 17/0211; B01D 17/0217; B01D 19/0042; B01D 19/0052; B01D 21/0006; B01D 21/0012; B01D 21/0042; B01D 21/0045; B01D 21/2411; B01D 29/46; B01D 35/30; B01D 45/02; B01D 46/406; E21B 43/34; E21B 43/38; F15D 1/14
See application file for complete search history.

(56) References Cited

U.S. PATENT DOCUMENTS

| | | | |
|---|---|---|---|
| 4,753,731 A | | 6/1988 | Drori |
| 5,173,195 A | * | 12/1992 | Wright ............... B01D 17/0211 210/237 |

OTHER PUBLICATIONS

International Search Report received in corresponding PCT Application No. PCT/CA2018/050822 dated Aug. 9, 2018, 3 pages.

(Continued)

*Primary Examiner* — Cabrena Holecek
(74) *Attorney, Agent, or Firm* — Parlee McLaws LLP; Chi Fai Andrew Lau

(57) ABSTRACT

A stacked-plate apparatus and method for separating a first fluid from a multiphase fluid, the apparatus having pairs of adjacent plates spaced apart from one another to form gaps, or flow passageways, between the plates. At a selected pressure, the first fluid of the multiphase fluid can flow along the gaps between the plates, to be collected when it exits the gaps. The other fluids of the multiphase fluid cannot flow along the gaps, and thus the first fluid is separated from the second fluid. The method and apparatus can be used to separate fluids that have different rheological properties, such as air and water, or water and oil.

25 Claims, 9 Drawing Sheets

Related U.S. Application Data

(60) Provisional application No. 62/529,309, filed on Jul. 6, 2017, provisional application No. 62/512,600, filed on May 30, 2017.

(51) Int. Cl.
  *B01D 46/40* (2006.01)
  *E21B 43/38* (2006.01)
  *F15D 1/14* (2006.01)
  *E21B 43/34* (2006.01)

(56) References Cited

OTHER PUBLICATIONS

Written Opinion received in corresponding PCT Application No. PCT/CA2018/050822 dated Aug. 9, 2018, 4 pages.

\* cited by examiner

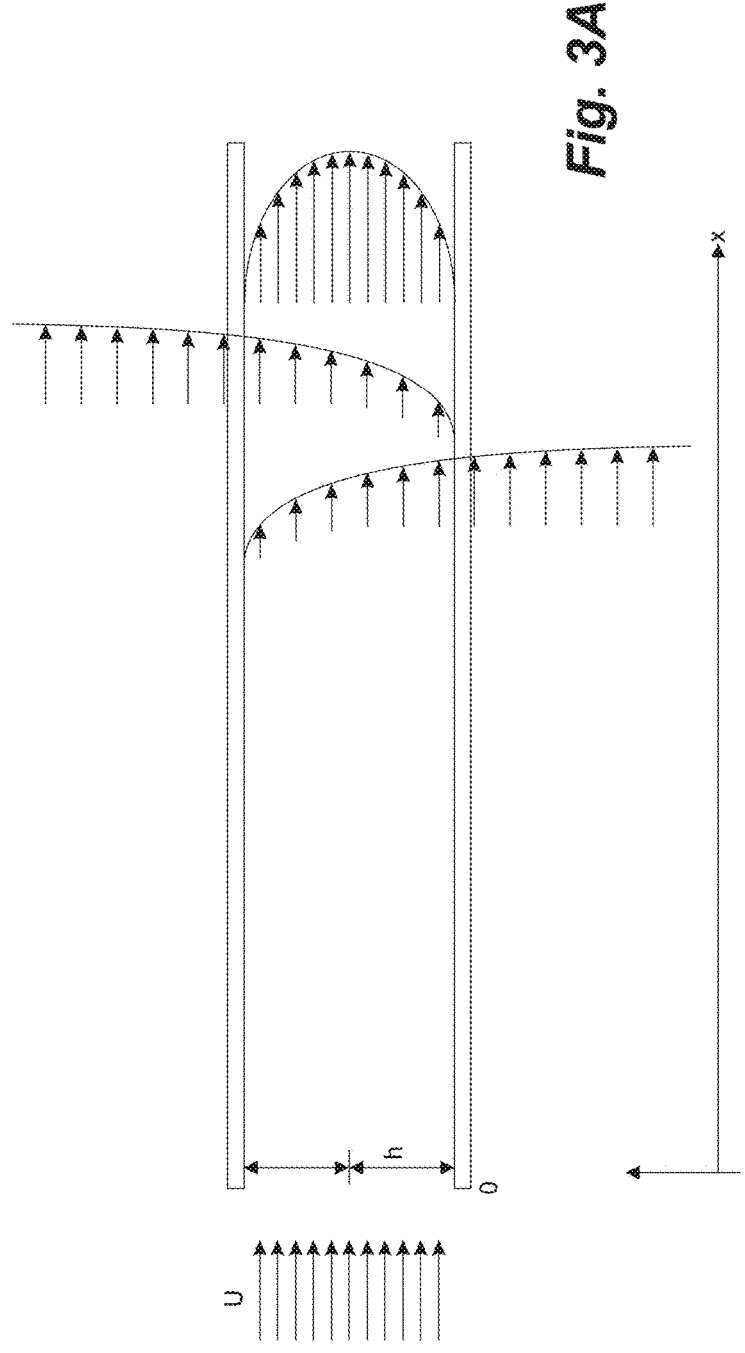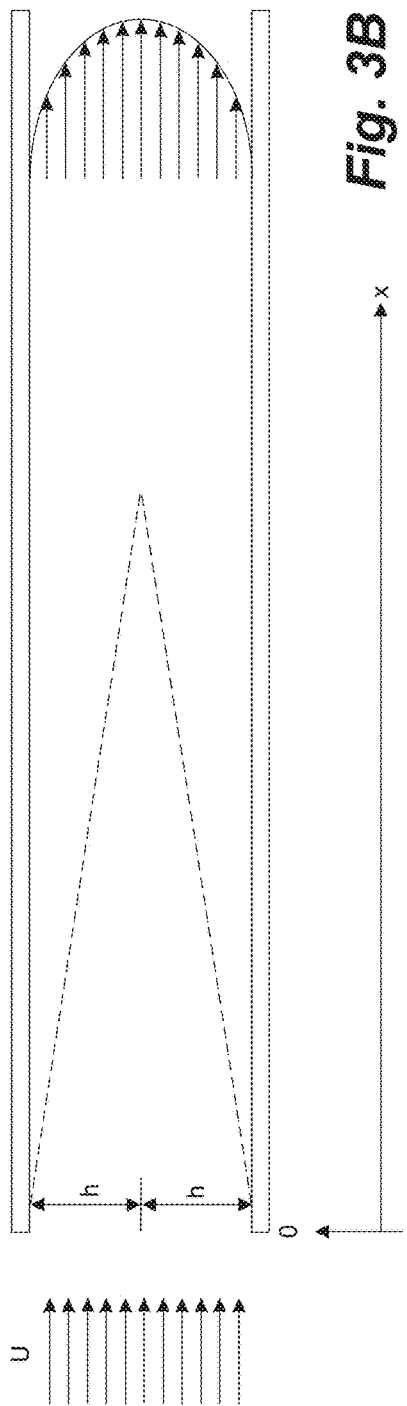

METHOD AND APPARATUS USING CLOSELY SPACED PLATES TO SEPARATE FLUIDS HAVING DIFFERENT RHEOLOGICAL PROPERTIES

CROSS-REFERENCE TO RELATED APPLICATIONS

This application claims the benefit of U.S. Provisional Application No. 62/529,309, filed Jul. 6, 2017, and is a Continuation-In-Part of U.S. patent application Ser. No. 15/991,771, filed May 29, 2018, and further U.S. Ser. No. 15/991,771 claims the benefit of U.S. 62/512,600, filed May 30, 2017, all which are incorporated herein by reference in their entirety.

FIELD

This disclosure relates to an apparatus and a method that uses rheological properties of fluids to separate a fluid from a multiphase fluid, and in particular relates to a stacked-plate type separation device that separates a fluid from a multiphase fluid input stream.

BACKGROUND

Most oil wells produce what is basically a mixture of oil and gas together with water (usually in the form of "brine", carrying quite large amounts of dissolved minerals, mostly common salt). At some point, it is necessary to separate gases from liquids and water from oil, in order to measure, transport, or process the hydrocarbon fluids.

The produced fluids are typically transported to a gas separator where free gas is removed. The liquid then passes to an oil/water separator where most of the water is removed. Examples of conventional gas separators include horizontal and vertical gravity separators and gas/liquid cylindrical cyclones. Examples of conventional liquid separators include horizontal gravity separators, free water knock-outs, liquid/liquid hydrocyclones, and flotation devices.

Conventional gravity separators are large settlement tanks into which the fluids are fed and allowed to settle under gravity, the liquids gradually sinking to the bottom of the tank while the gases rise to the top. The gases and liquids can then be drawn off separately. The separation of gas and liquid phases may be carried out in more than one stage, with each stage having a different operating pressure.

Commonly, gravity separation separates liquid components of differing densities and is carried out utilizing the relative buoyancies of the fluids. Control methods usually involve the use of a floatation device attached to control devices that govern the interface between two fluids. These devices operate control valves or throttles which allow the separated fluids to exit the separator container or vessel. This method is common and has been employed in separation devices for a long time. However, problems arise with known separation methods in cases where the relative density between the liquids is similar, or in locations where electricity, compressed air or gas or some other form of energy is not available to operate the control equipment.

Further, in many cases the flow of multiphase fluids entering a separator is erratic and variable in terms of both consistency and flow rate. These characteristics of the flowing fluids are known as the "flow regime" and are dictated by a number of factors including the flow rate of gas and liquid phases, the operating pressure and the size, profile and length of the pipeline that carries the flow into the separator. In some cases the flow regime is of slug form or semi-slug form, meaning that the instantaneous flow entering the separator has a substantial volume of the liquid phase followed by gas. Slugs of fluid can cause a flotation device in a gravity separator to carry heavier fluid into the lighter fluid stream. This unstable flow of heavier fluid with the lighter fluid is also known as liquid carry over.

It is an object of the present invention to provide a method and an apparatus for separating multi-phase fluids, which mitigates at least some of the aforesaid disadvantages.

SUMMARY

The flow of a fluid in a confined space, such as between adjacent plates of a plate filter, is influenced by the rheological properties of the fluid, including viscosity, surface tension and density. Described herein is a method and apparatus that uses the rheological properties of fluids to separate a fluid in an immiscible multiphase fluid from the other components of the multiphase fluid.

In one aspect, disclosed herein is a stacked-plate apparatus for separating a first fluid from a multiphase fluid that comprises the first fluid and a second fluid in an immiscible mixture, wherein the first fluid and the second fluid have different rheological properties, the apparatus comprising:
  at least one pair of adjacent plates stacked along an axis, each plate of the pair of adjacent plates comprising a first edge and a second edge, said plates of the pair of adjacent plates having opposing surfaces that are parallel to one another and spaced apart axially to form a flow passageway for flow of fluid therethrough from a fluid inlet formed by adjacent first edges of the flow passageway to a fluid outlet formed by adjacent second edges of the flow passageway, wherein:
    said opposing surfaces of the pair of adjacent plates are spaced apart a distance such that, at a selected pressure:
      the first fluid of the multiphase fluid can flow into the fluid inlet, along the flow passageway and out of the fluid outlet; and
      the second fluid of the multiphase fluid cannot flow into the fluid inlet, along the flow passageway, and out of the fluid outlet.

In one embodiment of the apparatus each plate of the pair of adjacent plates comprises a central opening forming the inner edge and an outer periphery forming the outer edge. The fluid inlet is at the outer edges of the pair of adjacent plates and the fluid outlet is at the inner edges of the pair of adjacent plates.

In embodiments the first fluid is a gas and the second fluid is a liquid, for example water. In embodiments the first fluid is a liquid and the second fluid is another liquid, for example the first fluid may be water and the second fluid may be heavy oil.

In embodiments the distance between the opposing surfaces is less than 50 µm. In embodiments the distance between the opposing surfaces is less than 25 µm.

In embodiments the viscosity of the second fluid is higher than the viscosity of the first fluid, and in other embodiments the surface tension of the second fluid is higher than the surface tension of the first fluid.

In yet another embodiment the stacked-plate apparatus further comprises a vessel, wherein the stacked plate apparatus is inside the vessel and the vessel comprises:

means for collecting the first fluid from the fluid outlet and delivering the first fluid to a first outlet of the vessel; and means for collecting the second fluid after the first fluid has been separated therefrom and delivering the second fluid to a second outlet of the vessel.

In another aspect, disclosed herein is a method for separating a first fluid from a second fluid, wherein the first fluid and the second fluid are immiscible and in a multiphase fluid, the method comprising:

in a pressurized vessel, spacing the opposing surfaces of at least one pair of adjacent plates a distance apart from one another to form a flow passageway therebetween for flow of fluid therethrough from a fluid inlet of the flow passageway to a fluid outlet of the flow passageway;

delivering the multiphase fluid to the fluid inlet of the flow passageway;

applying a pressure to the multiphase fluid in the vessel, and under pressure:

the first fluid flows along the flow passageway and out of the fluid outlet, the second fluid does not flow along the flow passageway and out of the fluid outlet;

collecting the first fluid after the first fluid flows out of the fluid outlet; and collecting the second fluid from about the fluid inlet.

In one embodiment, the second fluid is collected at a bottom of the vessel. I embodiments of the method, the fluid inlet is at the outer edges of the pair of adjacent plates and the fluid outlet is at the inner edges of the pair of adjacent plates.

In embodiments the first fluid is a gas and the second fluid is a liquid, for example water. In embodiments the first fluid is a liquid and the second fluid is another liquid, for example the first fluid may be water and the second fluid may be heavy oil.

In embodiments the distance between the opposing surfaces is less than 50 μm. In embodiments the distance between the opposing surfaces is less than 25 μm.

In embodiments the viscosity of the second fluid is higher than the viscosity of the first fluid, and in other embodiments the surface tension of the second fluid is higher than the surface tension of the first fluid.

BRIEF DESCRIPTION OF THE DRAWINGS

Various of the drawings below set forth arrangements of features affecting at least fluid flow and structure considerations which can vary according to the process design considerations, and unless specifically noted, proportions illustrated thereon are not necessarily to scale.

FIG. 3A is an illustration of the overwhelming effect of Blasius boundary layer for parallel plates spaced very close together where the displacement, shown fancifully beyond the wall dimensions, exceeds ½ of the spacing between the plates, a free stream unable to be formed therebetween;

FIG. 3B illustrates the closely-spaced plates of FIG. 3 with a stream flow fully influenced by boundary layer effects;

DETAILED DESCRIPTION

Rheology is the study of flow and deformation of materials under applied forces, and a "rheological property" of a fluid, as used herein, is a property that is used to define fluid behaviour, including fluid viscosity, interfacial surface tension between two fluids and interfacial surface tension between a fluid and a boundary wall, wettability, density, molecular weight and specific gravity.

A "multiphase fluid" as used here includes a fluid, comprising more than one phase, such as water- or oil-based liquids and gas, or comprising more than one fluid wherein the fluids are in the same state or phase (i.e. liquid-liquid systems such as oil droplets in water), but have different chemical properties. A multiphase fluid can be a fluid with two or more different fluids in it. "Immiscible" as used herein means that two fluids are incapable of being mixed or blended together to form a homogeneous mixture, and will eventually separate into layers.

"Fluid", as used herein, includes gases and liquids. "Gases" includes without limitation air, nitrogen, carbon dioxide, carbon monoxide, methane, ammonia, hydrogen chloride, nitrous oxide, nitrogen trifluoride, sulphur dioxide and sulphur hexafluoride. "Liquids" as used herein includes, without limitation water in all its forms, for example fresh water, salt water, wastewater, brine and process water, liquid hydrocarbons such as heavy oil (e.g., bitumen), medium and light crude oils, alcohol, mercury, glycol and liquid metals.

An advantage of the method and apparatus described herein is that it can be used to separate immiscible fluids that have a similar density, such as water and heavy oil, but which differ in another rheological property. Another advantage is that the separation process can be achieved under differential pressure, without the need for float or level controllers, which will allow for energy efficient operations in remote locations and which also avoids the known susceptibility of flotation devices to slugs of fluid, which can cause liquid carry over.

In addition, because the space between the plates is so small, this apparatus is resistant to plugging by sand and particulate, which is common in the oil and gas industry where fractured wells are produced through conventional separation equipment.

It has been observed that the flow of a fluid in a confined space, such as between adjacent plates of a plate filter, is influenced by the rheological properties of the fluid, including viscosity, surface tension and density. These properties influence the development of a boundary layer, or the extent of this layer, which plays a dominant role in the flow performance of the filter.

Figure 1:
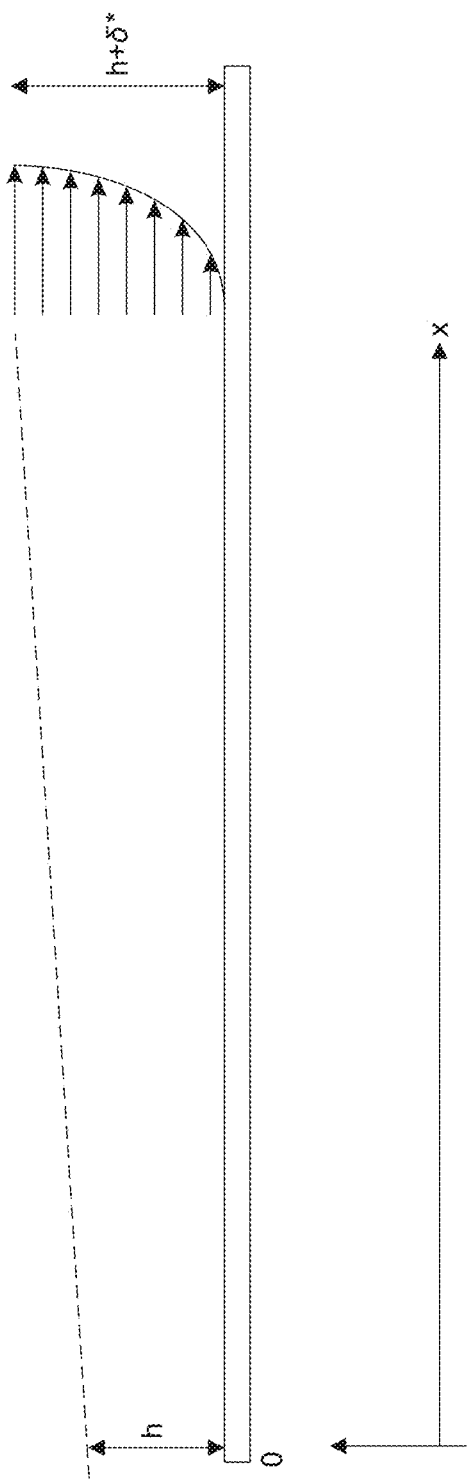
FIG. 1 is an illustration of the displacement effect of the Blasius laminar boundary layer formed on a semi-infinite plate, from zero velocity to about 99% of free stream mean velocity.

With reference to FIG. 1, the general behaviour of fluids flowing over a flat plate is shown. The solution to boundary layer displacement (dashed line) was given by Blasius in 1908 and is illustrated in this Figure. In the case of using stacked plates to create a filter, where the spacing between adjacent plates is measured in microns, Applicant has determined that fluid flow mechanics becomes important. Applicant believes boundary layer displacement becomes as large or larger than the plate spacing (measured in microns), and the plates confine the space where a boundary layer is not allowed to grow to the extent of the Blasius displacement.

Figure 2:
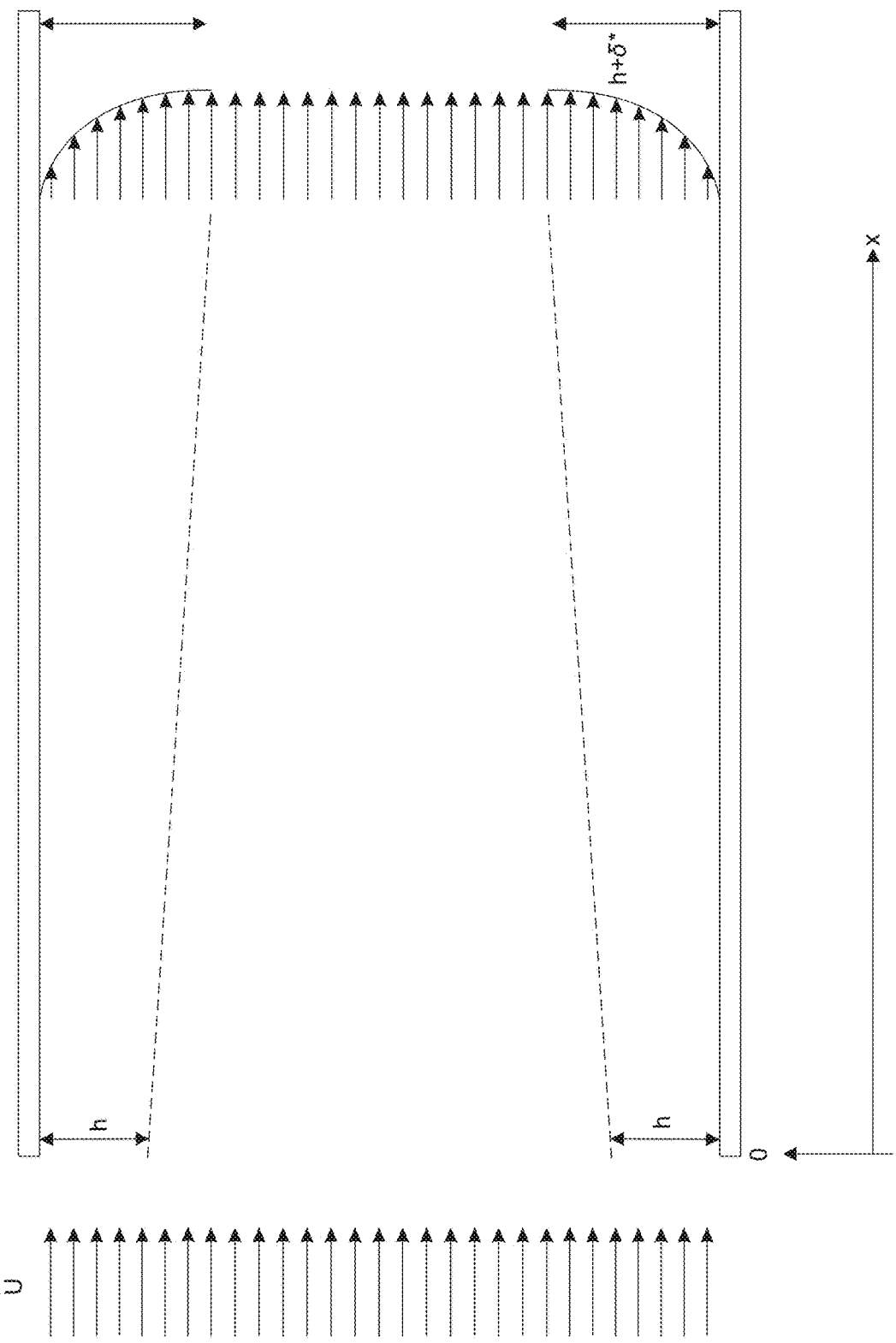
FIG. 2 is an illustration of the effect of the minimal Blasius boundary layer effect for parallel plates spaced sufficiently apart for formation of a typical free stream formed therebetween.

As shown in FIG. 2, in a normal case of designing a passage for fluid flow for a low pressure drop therealong, opposing plates are spaced sufficiently apart such that the normal boundary layer displacement (dashed line) is less than the mid-point between the plates and the displacement, to about 99% of the free stream mean velocity, is achieved.

If the plates are arranged in a more closely-spaced manner the displacement is constrained. As shown in FIG. 3A, for a given fluid flow, the normal boundary layer displacement is shown fancifully for each plate. Note that the extent of the displacement, generally deemed to be about 99% of the free stream mean velocity, happens to be larger than the spacing of the plates when arranged in such closely-spaced and opposing fashion.

In FIG. 3B, therefore, when the flow stream is bounded between two plates, and not allowed to grow due to respective boundary layer displacements, the resulting flow would need to show a significant increase in velocity in the flow streams spaced away from the plates to accommodate boundary layer growth and preserve momentum. In most circumstances, with widely spaced passages, boundary layer effect is small and often ignored for flow design considerations. In the case of the flow through the closely-spaced passages of a plate filter however, boundary layer effect is the dominant factor in the plate design.

The rheological properties of a fluid have an effect on the extent to which a fluid is able to flow through a space created by two plates, at least in part because of these properties affect whether and to what extent a boundary layer is formed. Two different fluids, be they a liquid and a gas, or two liquids, form boundary layers on a flat wall that differ from one another, because they have different rheological properties. These differences can be exploited to separate an immiscible mixture of the two liquids, using a stacked-plate filter.

Disclosed herein are a method and apparatus which use a stacked-plate apparatus to separate a first fluid from a multiphase fluid, by designing the apparatus to allow the first fluid to flow through the filter, and prohibit the other fluids of the multiphase fluid from doing so. A combination of the rheological properties of the fluids themselves, and the properties of the plate stack itself, as described below, affect the ability of the stack to distinguish one fluid over another, and therefore its ability to separate the first fluid from the other fluids.

Figure 4:
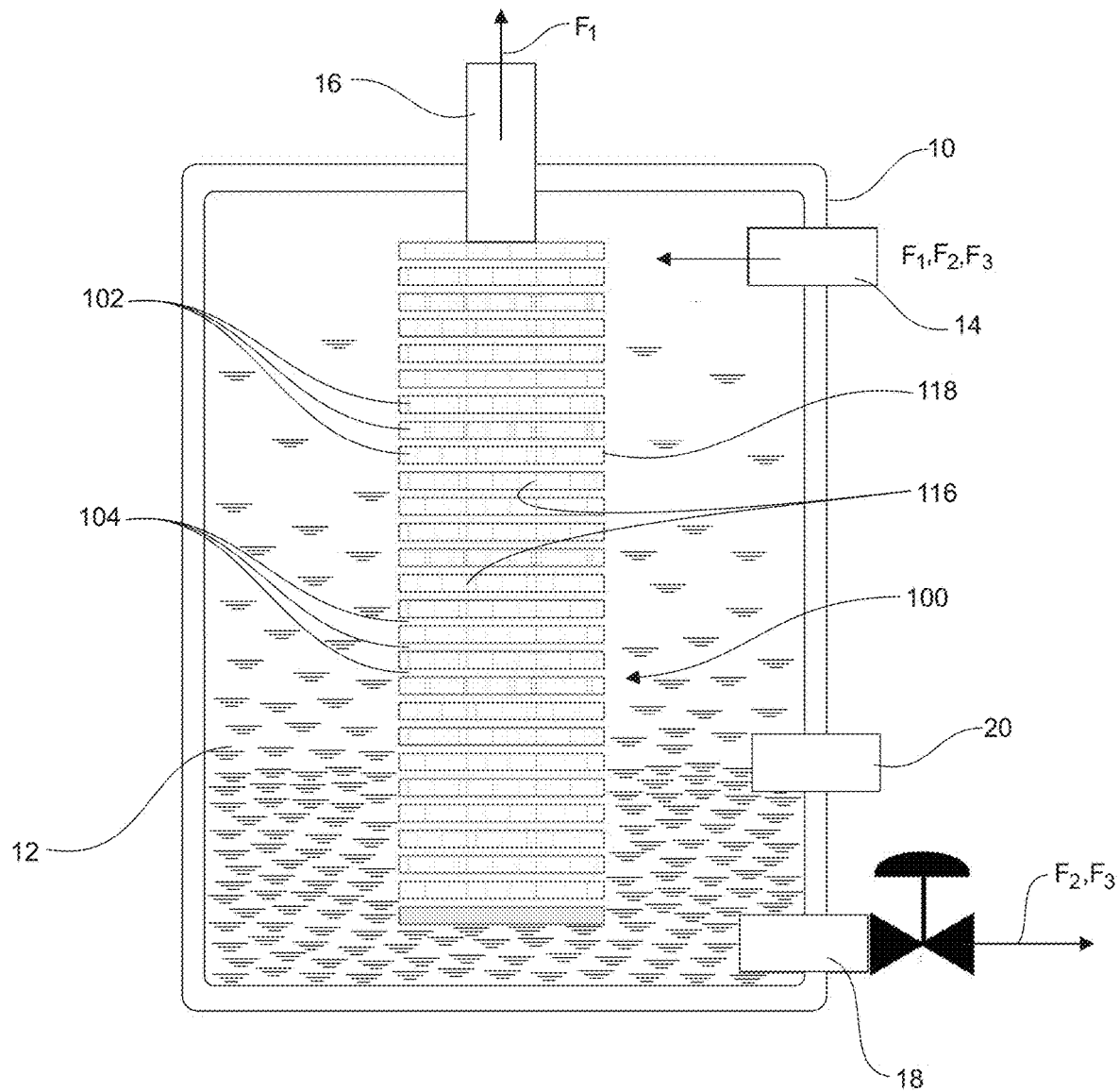
FIG. 4 is an illustration of an embodiment of an apparatus comprising the stacked-plate filter of the instant disclosure in an enclosing vessel.

An exemplary apparatus comprising a stacked-plate filter is shown in FIG. 4. A cylindrical, pressurized vessel 10 receives a multiphase fluid stream $F_1$, $F_2$, $F_3$, comprising at least two immiscible fluids, from field piping, for example that which is fluidly connected to and extending from a wellhead. The vessel comprises a chamber 12, within which is housed a stacked-plate filter 100 that comprises a plurality of stacked disks or plates 102 arranged in parallel arrangement along a central axis. The plates are spaced apart from one another to form gaps 104 therebetween, and these gaps function as flow or fluid passageways.

The multiphase fluid stream $F_1$, $F_2$, $F_3$, is introduced into the vessel at vessel inlet 14, and encounters the filter 100, in this embodiment, at the outer edges 118 of the stacked plates 102. At least one fluid in the multiphase fluid stream, say $F_1$, is able to enter the gap and flow along the fluid passageway or gap 104 between the plates 102 to exit the gap at the inner edges 116 of the plates. The other fluids in the multiphase fluid stream, say $F_2$ and $F_3$, cannot flow through to the inner edges 116 of the stacked plates 102. The fluid $F_1$ exiting the gap 104 at the inner edges 116 flows to a vessel outlet 16, which in embodiments is fluidly connected to a bore 106 of a mandrel 108 (see FIG. 6). Mandrel 108 may have a plurality of passages 109 therethrough to the bore, the passages being discrete slots dimensioned to allow fluid flow but retain sufficient structural competence to support the filter plates 102 thereon. As an example, mandrel 108 could be a 3 inch pipe for supporting 6" diameter plates having corresponding 3" central openings.

Fluids $F_2$ and $F_3$ are unable to enter the filter stack, and accumulate in the bottom part of the vessel 10. Above the accumulated fluids $F_2$ and $F_3$ is a mixture of fluids $F_1$, $F_2$, $F_3$, from which $F_1$ is continuously depleted, via the filter 100. An interface forms between fluids $F_2$ and $F_3$, and the mixture above, the interface being located above a vessel discharge 18. Fluids $F_2$ and $F_3$, are collected from the bottom of the vessel by being discharged at discharge 18, for example through a pressure control device. Fluid $F_1$ remains in the vessel chamber, until it passes through filter 100 and is collected in mandrel 108. An optional additional wash port 20 is shown.

For reverse flow, a fluid stream $F_1$, $F_2$, $F_3$, may flow into outlet 16 and along the bore of mandrel 108, where fluid $F_1$ enters the gaps between the plates and flows from the inner periphery or edges 116 of the stack to the outer periphery or edges 118 of the stack, from where it may be collected. Fluids $F_2$ and $F_3$, cannot flow through the gaps between the plates to the outer periphery and therefore flow down the bore of the filter to be collected therefrom, for example by a flow-controlled conduit (not shown) extending from the bore and to discharge 18 for directing these fluids out of the vessel.

Figure 5:
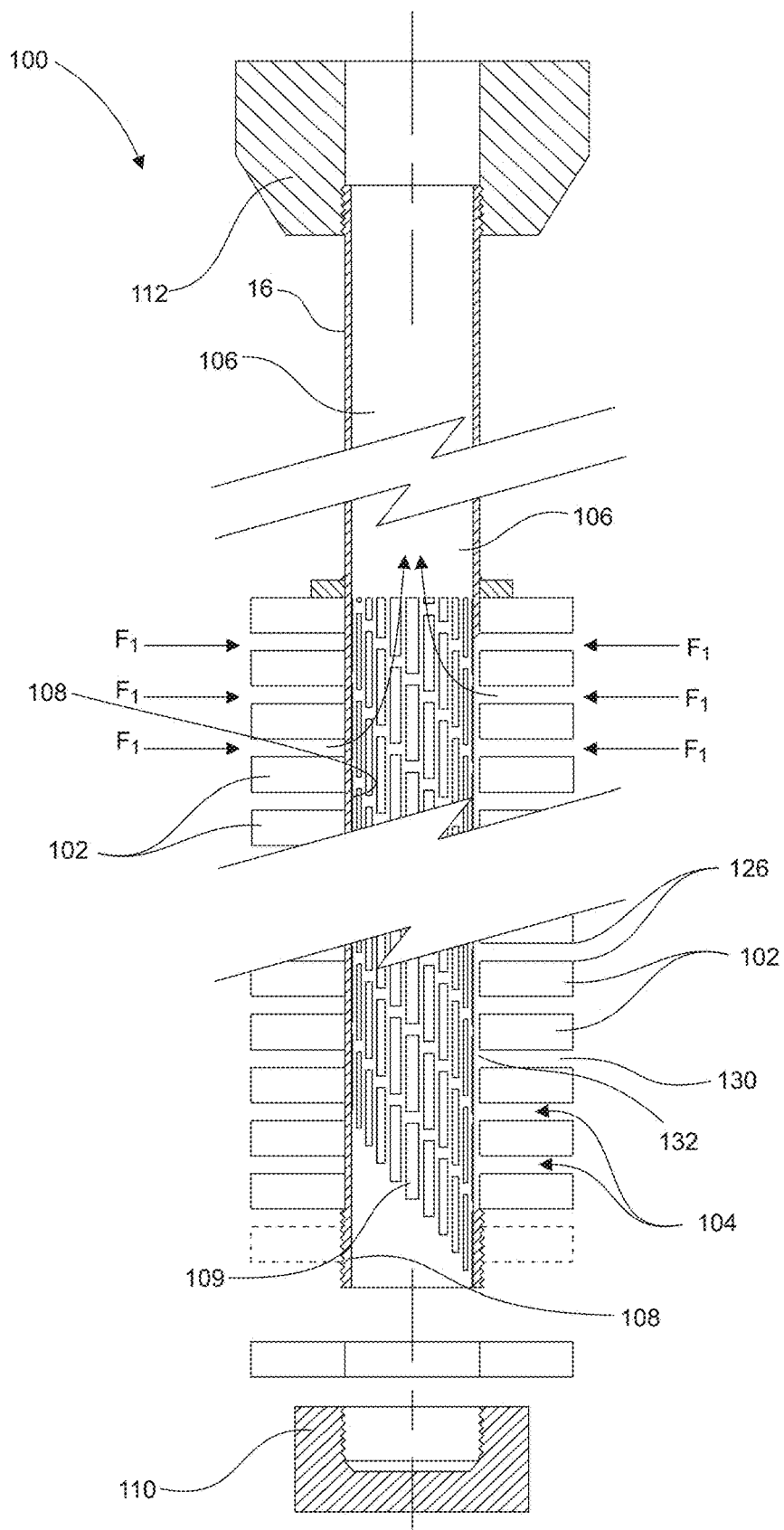
FIG. 5 is an illustration of an embodiment of a stacked-plate filter of the instant disclosure.

FIG. 5 is a representation of a stacked-plate filter with a plate-supporting mandrel 108 therethrough. Each plate is generally planar, however other functionally similar shapes are contemplated herein. The plates 102 are aligned and stacked adjacent one another, for example along the mandrel 108, in parallel yet spaced, arrangement.

In this embodiment the plates have parallel upper and lower planar surfaces. A plurality of gaps 104 between adjacent plates 102,102 form generally uniform passageways for fluid F to flow radially therethrough, from a fluid inlet 130 between either the outer or inner edges of the paired plates to a fluid outlet 132 between the inner or outer edges, respectively, of paired plates. Flow is preferably from out-to-in, but may also be from in-to-out, for reverse flow.

In the embodiment shown in FIG. 5, the plates are secured on the mandrel 108 with a nut or cap 110. As shown in FIG. 6, the mandrel 108 can be integrated with the tubular forming the fluid outlet 16, and comprises a plurality of slots through which fluid F1 exiting the gaps between the plates can enter the bore 106 of mandrel 108 (or vice versa for reverse flow). A dognut 112, fastened adjacent to the top end of the filter mandrel 108 or vessel outlet 16, may rest on a shoulder in the aperture to the vessel 10 to prevent the filter 100 and the vessel outlet 16 from falling into the vessel 10, while also suspending same vertically along the vessel axis. A flange or holddown retainer (not shown) can restrain the dognut 112 in the aperture, removal of the flange enabling removal of the filter from the vessel.

Figure 6A:
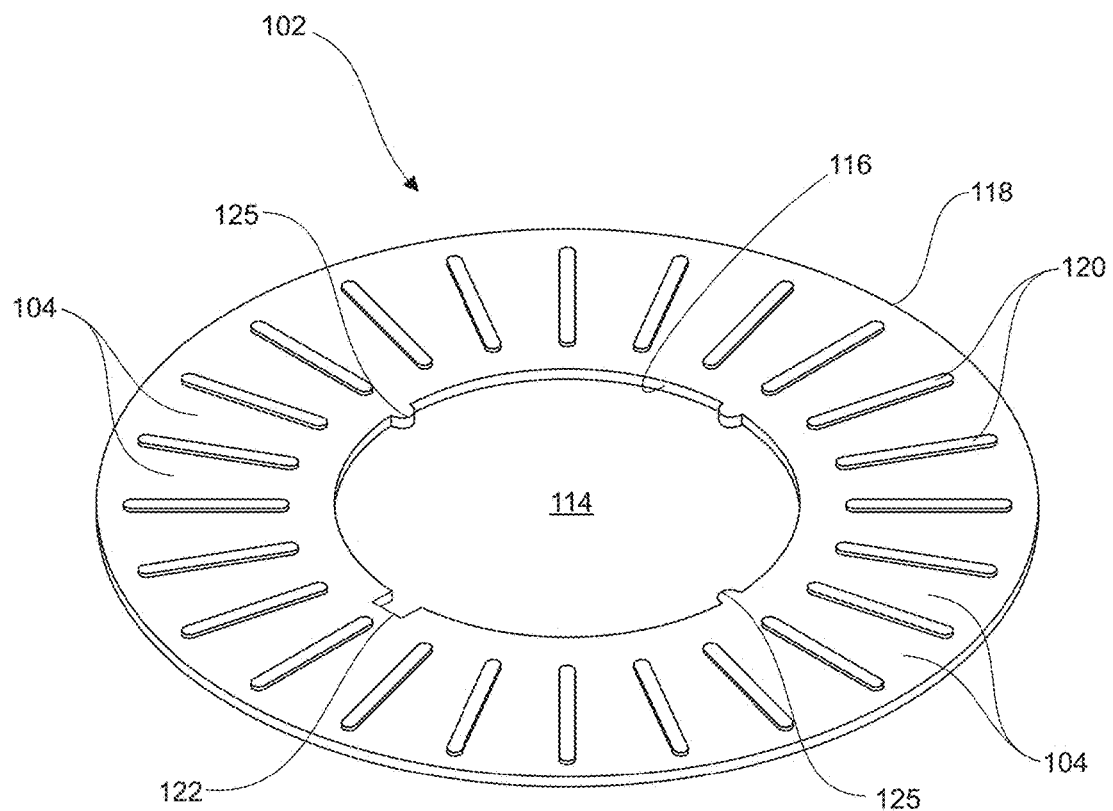
FIG. 6A is an illustration of an embodiment of a plate or disc or a stacked-plate filter of the instant disclosure.

FIG. 6A depicts the general configuration of a plate or disk 102 useful herein. The plates have a central opening 114, which has inner edge 116 forming an inner diameter (ID) of the plate, and an outer periphery of the plate has an outer edge 118 forming an outer diameter (OD) of the plate. The fluid F in the gap 104 between adjacent plates 102,102 flows radially from in-to-out (inner edge to outer edge) or out-to-in (outer edge to inner edge). In practice, one embodiment of this plate has a 6" (152 mm) outside diameter, a 3" (76 mm) central opening, and a nominal thickness of 0.03125+/−0.00100" (794+/−25 µm) thickness.

Each plate 102 may also comprise portions that have an increased thickness forming a raised-face area or boss 120 on at least one side, but which can also be on both sides of the plate 102, for providing required spacing between plates when assembled. The bosses 120 can be spaced about the plate's circumference at an intermediate radial orbit. For gap dimensional stability, plates 102 having a large radial extent, or which are subject to compressive forces may benefit from additional bosses. All of the plates need not have the same configuration of bosses (e.g., dimensions, number and location of bosses may vary), and individual plates may have different configurations of bosses on different sides. However, in preferred embodiments the plates have bosses 120 that are at the same or similar location and of the same or similar dimension, so that in the stacked-plate apparatus the bosses of adjacent plates align with one another. The embodiment of the plate 102 shown in FIG. 6, bosses have a nominal thickness of 0.0020+/−0.0005" (50+/−13 µm).

Figure 6B:
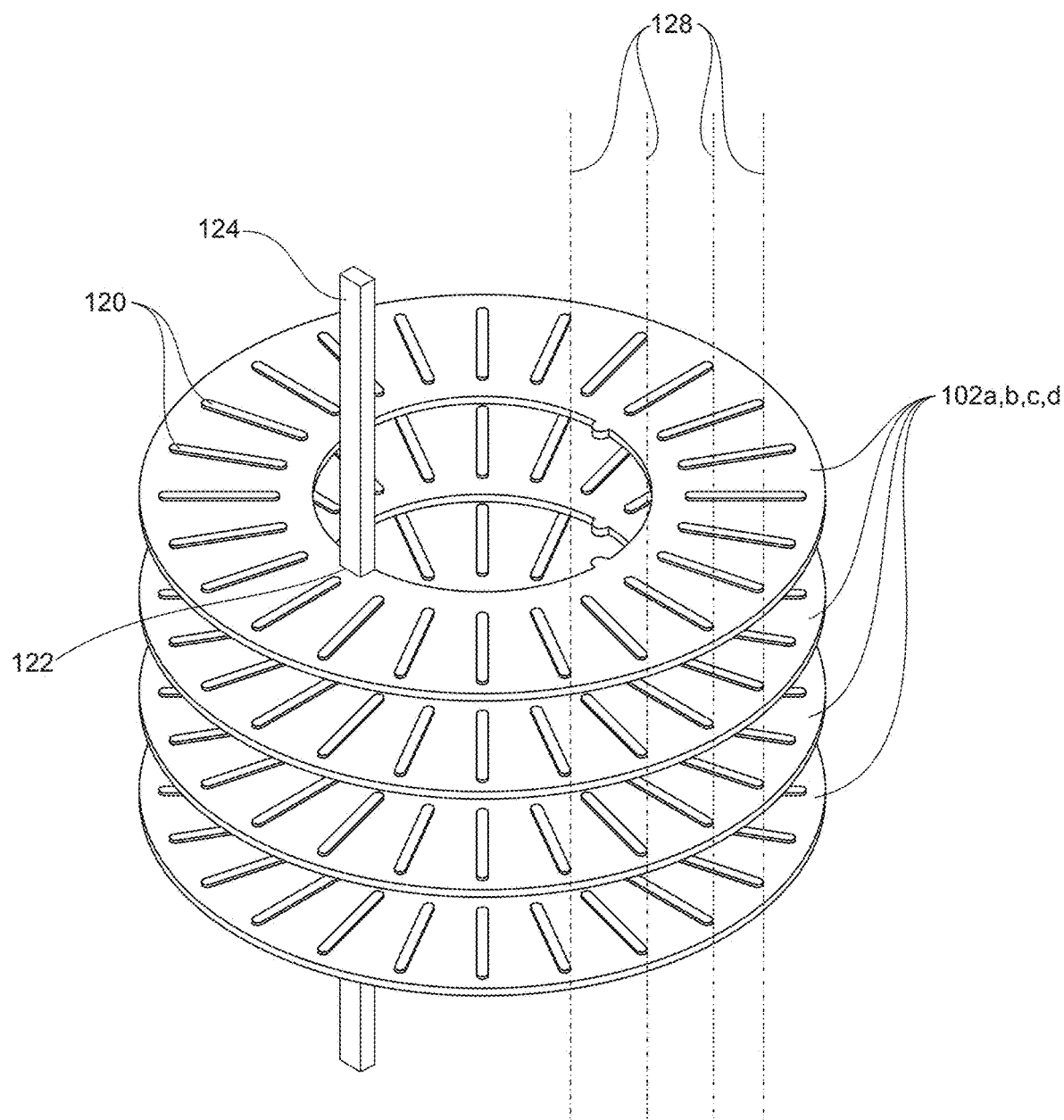
FIG. 6B is an illustration of the plates of FIG. 6A stacked in a plate assembly.

As shown in FIG. 6B, when the plates are stacked in an assembly, a keyed notch 122 in each of the plates may align angularly with a key 124 on the mandrel (not shown). In this embodiment, the bosses 120 are all of the same shape and size, and line up with one another (shown by lines 128). The bosses are located on only one side of the plate 102 and have a nominal thickness of 0.0020+/−0.0005" (50+/−13 µm), so that in a stacked-plate apparatus the size of the gap 104 between the plates is about 50 µm. This embodiment of the plate 102 may be useful for making a stacked-plate filter that can separate gas from water.

Spacers 125 distance the inner edge 116 of the plate from the mandrel 108, to provide an annular flow path to the slots in the mandrel, additional centering for the plate and a tighter fit than a plate without the spacers.

The plates 102 can be made of a synthetic material for reduced fluid friction control of surface tension or surface wettability and for erosion resistance. One such synthetic is a polymer material including silica. In one embodiment, the plates are made of a polymer material containing silica including nylon material. In some embodiments, the plates 102 are made of a polymer material, such as Nylene® 5133 HS having about 33% silica, manufactured by Nylene Canada Inc. of Arnprior, Ontario, Canada. In another embodiment, the plates 102 are made of a polymer such as Vydene® R533 NT having about 33% silica, manufactured by Ascend Performance Materials of Houston, Tex., United States of America.

The embodiment of the plate 102 shown in FIG. 6, the plate may be made with Nylene® 5133 HS or Vydene® R533 NT, and used in making a stacked-plate filter that can separate gas from water.

An inert polymer with a silica base is quite chemically neutral and can in the order of at least 5× stronger than a stainless material without issues caused with $H_2S$ stress cracking or oxidation problems associated with carbon steel. The polymers are also recyclable.

Those skilled in the art appreciate, however, that the plates 102 may alternatively be made of other suitable materials such as carbon steel or stainless steel. However, compared to plates made of steel, the polymer plates 102 have advantages including reproducible manufacturing tolerances in the order of within 5/10,000ths of an inch. Such tolerances are more difficult to achieve economically in materials such as carbon or stainless steel. Polymer plates may have compressive strength in the order of at least 10,000 psi, contribute to lowering pressure drop due to reduced surface drag, and are also chemically resistant to oilfield chemicals. Other materials used to make the plates 102 may include coatings that affect the wettability 'non-stick' or inversely adhesion and surface tension, to alter the resistance of the plate to intrusion by the heavier, more viscous or higher surface tension fluid.

An injection mold process can be employed to inject the polymer material into a suitable mold for making the plates. It has been determined that different parts of a polymer plate can have a different overall shrinkage. Thus, edges of plates may shrink to a different extent than the bosses, or differently sized bosses may have different shrinkage characteristics. The injector press may be insufficient to keep the dies completely closed resulting in a small amount of flash material where the dies meet. This flash, no matter how small can result in an out of spec plate. To mitigate the effect of flash material on fluid flow, the dies are designed so that the flash material, if formed, would be deposited intermediate the fluid inlet edge of the plate, away from the corner of the plate 126 (FIG. 5) where fluid influx occurs.

As disclosed herein, gap 104 between each pair of adjacent plates 102,102 is configured to prevent certain fluids of a multiphase fluid from flow through the gap. Thus, when flowing out-to-in, gap 104 is configured to prevent certain fluids in a multiphase fluid from entering the gap at outer edge 118, flowing along the gap 102, and exiting the gap at inner edge 116. When flowing in-to-out, gap 104 is configured to prevent certain fluids in a multiphase fluid from entering the gap at inner edge 116, flowing along the gap 102, and exiting the gap at outer edge 118. "Configured", as used herein includes reference to the dimensions of the gap (e.g., height, width and length), the materials that the plates 102 are made of (that is, the materials around the edge of the gap) and other features of the gap that would affect the flow of fluids therethrough (e.g., spacing/size of bosses, and the configuration of edges of the plates to enhance/restrain flow).

The apparatus provided herein, therefore, includes a series of stacked plates that have an interplate spacing, or gap size, which is of a defined dimension and has material properties (i.e., 'wettability' or surface tension) such one fluid of a multiphase fluid can flow along the space between the plates from the fluid inlet to the fluid outlet, and another fluid of the multiphase fluid will not be able to flow along the space. For example, as an immiscible multiphase fluid enters a chamber of a separation vessel that has a stacked-plate filter 100 disclosed herein, fluids with a higher surface tension, a higher viscosity, or both, may not be able to pass through the gap 104, and fluids with a lower surface tension, a lower viscosity, or both, may pass through the stack, thus separating the fluids.

Contemplated herein are an apparatus and method to separate immiscible multiphase fluids that comprise gases only, gases and liquids, or two or more immiscible liquids. Thus, contemplated herein are an apparatus and method to separate a gas from a gas, a gas from a liquid (e.g., gas from water), or a liquid from another liquid (e.g., water from bitumen, medium crude oil from bitumen).

At least three properties of the plate stack may be relevant to the ability of a stack of spaced apart plates to separate one fluid of a multiphase fluid from other fluids of a multiphase fluid, and these are:

inter-plate spacing—the distance between the plates affects whether a fluid can flow along the flowpath between the plates from the fluid inlet to the fluid outlet;

plate length or diameter for radial flow—the distance from the inner edge to the outer edge of a plate (the radial distance), will affect whether a fluid can flow along the flowpath between the plates from the fluid inlet to the fluid outlet, and if not, where along the flowpath it becomes blocked;

interaction between fluid and the plate—the fluids and plate may interact in a way that either promotes or hinders the movement the fluids along the flowpath. For example wettability of the plate by a fluid may enhance flow, or a strong interfacial tension between a fluid and the plate may inhibit flow.

It is counterintuitive that stacked-plate apparatus could be used to separate a fluid from a multiphase fluid that has a fluid component which can plug the apparatus. Logic would suggest that the apparatus would become plugged and inoperative. However, it is shown herein that a stacked-plate apparatus can allow a first fluid, but not a second (or additional) fluid, to flow through the gaps between the plates. The second fluid does not impede the first fluid from entering into the gaps. Thus, even though the second fluid is blocked from passing into the space between the plates, the first fluid is able to penetrate that fluid blockage or plug and flow through the space, without carrying the second fluid with it. The second fluid is plugged from passage therethrough, the first is not.

Whether two fluids in a multiphase fluid can be separated from one another depends on the relative rheological properties of the two fluids. Typically, when assessing the interaction between two fluids, it is the more viscous fluid and/or the fluid with the higher surface tension that cannot flow through the space between the plates, and it is the less viscous fluid and/or the fluid with the lower surface tension that can flow through the space in the presence of the other fluid. Without being bound by theory, the interfacial tension between the two immiscible fluids and those immiscible fluids and the boundary wall appear to be a dominant factor in determining whether the two fluids can be separated using closely stacked plates. Thus, the ability of a fluid to flow through an inter-plate space that would normally be blocked by another fluid—i.e., break through or prevent the formation of the fluid block—appears to be largely determined by the interfacial tension between the two fluids The relative viscosity of the fluids appears to also be a factor determining whether the two fluids can be separated using closely stacked plates. Water has a viscosity of about 1 cp, whereas air has a viscosity of about 0.02 cp, thus a 50-fold difference in viscosity. The inventors have separated air from water in a stacked-plate filter. Thus, fluids with a 50-fold difference in viscosity can be separated using closely stacked plates. The separation of bitumen (viscosity of about 1,000,000 cp) from medium crude oil (viscosity of about 1,000 cp), or water or gas, is contemplated by the apparatus and method herein.

Disclosed herein is a method of designing a stacked-plate filter that separates a first fluid from a second fluid that have different rheological properties. The method requires preliminary testing for a given plate geometry and composition and fluid composition. This testing includes:

a) determining the maximum inter-plate spacing at which the second fluid, typically the more viscous fluid and/or the fluid with higher surface tension, will block the fluid passageway between two plates;

b) determining whether the first fluid, typically the less viscous fluid and/or the fluid with lower surface tension, will flow through the filter at the inter-plate spacing that blocks the second fluid;

c) pumping both the first and second fluids into a separation chamber together, under pressure, to determine if the first fluid can be separated from the second fluid when they are mixed together; and d) pumping the second fluid into the separation chamber to plug the plates followed by pumping a mixture of both fluids into the chamber to determine if the first fluid can 'unclog' the plates and allow the separation process to continue.

As is apparent, if the multiphase fluid includes more than two fluids, then the "second" fluid tested is a combination of two or more fluids, or each of the "second" fluids in the multiphase fluid is tested separately.

Typically, when determining the maximum inter-plate spacing at which a second fluid will block the space between two plates, the longer the radial distance of the plates (i.e., the distance from inner edge to outer edge), the further apart from one another the plates are spaced and the deeper (further along the flowpath) the plugging will occur. Conversely, paired plates with a shorter radial distance may need to be placed closer together for plugging with the second fluid to occur.

Assessing fluid blockage is typically done by measuring the pressure drop across the stacked-plate assembly, that is, by measuring the differential pressure between fluid inlet and fluid outlet. A stacked-plate assembly is considered to be blocked by a fluid when the pressure drop no longer has a relationship to flow rate or becomes sufficiently high relative to the less viscous fluid as to make the relative flow rate immaterial.

Once it is determined, for a given plate geometry and composition and fluid composition, that it is possible to separate a first fluid from a second fluid using closely spaced plates, the plates and apparatus can be refined to enhance the ability of the stacked-plate apparatus to separate the two fluids. In operation, at the required flow rate and pressure drop (differential), the first fluid should flow through the gaps between the plates even in the presence of the second fluid, and conversely, the second fluid should not flow through the gaps even in the presence of the first fluid. Thus, refinements may include:

a) reducing the maximum interplate spacing determined above;

b) increasing or decreasing the radial distance (the length of the flow passageway);

c) changing the material used to make the plate;

d) changing the configuration of the plate, for example by pleating an edge of the plate or by adding a lip to an edge of the plate, as described in U.S. Provisional Application No. 62/529,309, and U.S. patent application Ser. No. 15/991,771; and/or e) changing the number of plates in the apparatus, as increasing the number of plates in a stack reduces the overall pressure drop, however there is a practical limit to the number of plates that can be used.

Examples

A series of tests established that the apparatus separates fluids that have different rheological properties.

A testing apparatus was set up as shown in FIG. 4. Vessel inlet 14 was connected to high pressure pump and gas lines (either air to 150 psi, or $N_2$). Discharge outlet 18 (liquid outlet) was fit with a valve, and had a 1/16" or 1/32" choke. The apparatus further included a valved vessel outlet 16 (degas monitor port) and a valved port to monitor fluid levels in the vessel, which is normally closed during a test Ninety-five (95) plates having a 6" (152 mm) outside diameter, a 3" (76 mm) central opening and a 1/16" (1.5 mm) thickness were spaced apart at a nominal distance of 25, 50, 75 or 100 μm in a filter stack.

Air, as a first fluid, and water, as the second fluid. were pumped through the plates at different flow rates, with a corresponding increase in pressure differential as the flow rate increased. It was found that for water there was a minimum inter-plate spacing below which water could not flow through space between the plates.

At 100 μm between the plates, fresh water was able to flow through the plates with a pressure drop that had some relationship to fluid velocity.

Figure 7:
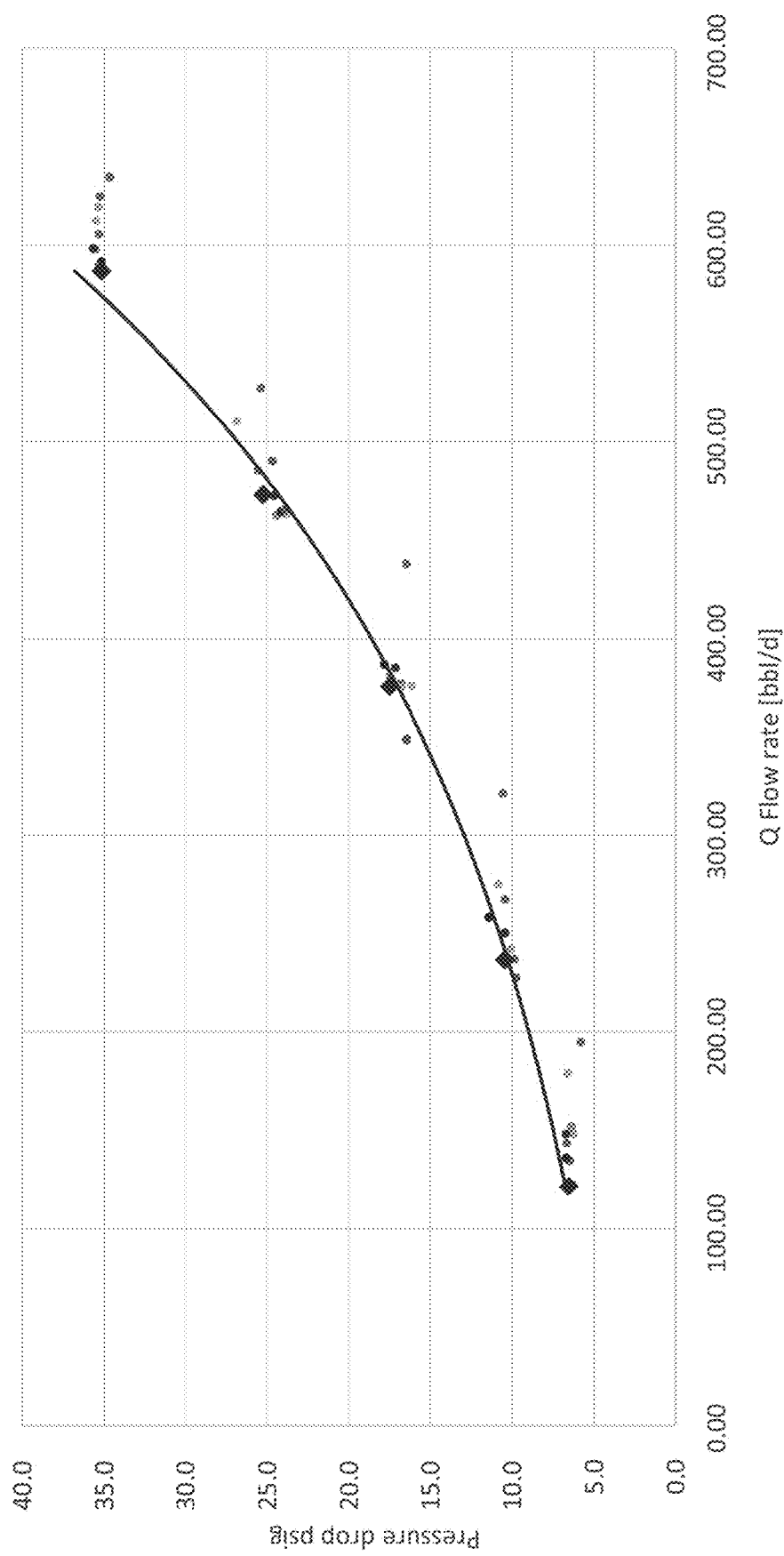
FIG. 7 is a plot of pressure drop (psig) vs. flow rate (bbl/d) for a filter stack of 95 plates spaced apart by 100 μm.

With reference to FIG. 7, the results of flow tests are shown of the flow through plates spaced apart by 100 μm. Ten pump trials were performed, each at idle, 25%, 50%, 75% and 100% throttle on a gas powered centrifugal pump. As shown by the curve in this Figure, the pressure differential rose from 6 psi through 35 psi for flow rates of 120 through 580 bbl/d, respectively. Each of the ten trials is plotted in FIG. 7 and demonstrates an increasing pressure drop for a given flow rate. This indicates a component of the flow regimes that develops over time such as the building of a boundary layer or the cumulative effect of surface tension as the plate becomes completely wetted with the pumped fluid.

Figure 8:
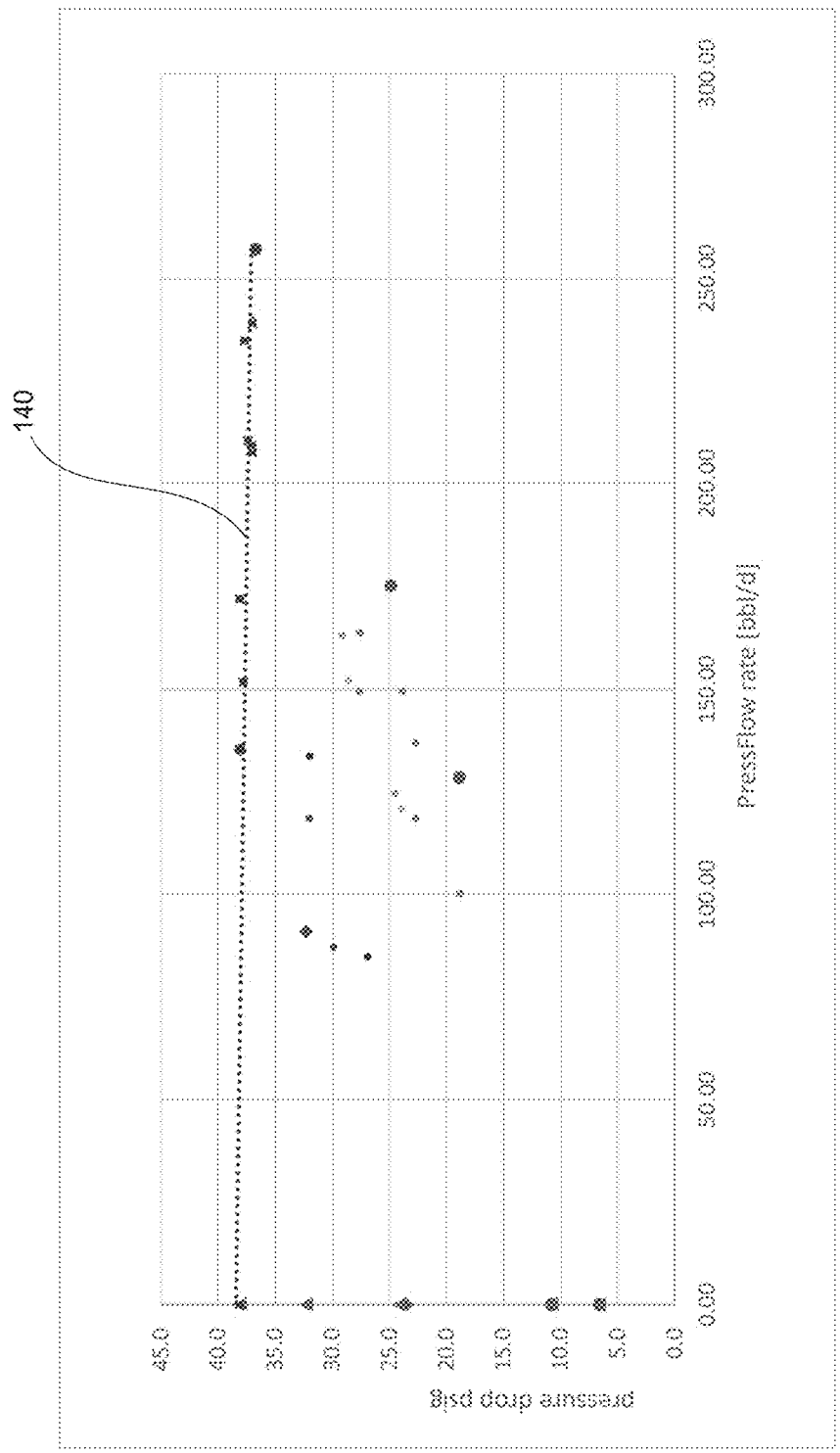
FIG. 8 is a plot of pressure drop (psig) vs. flow rate (bbl/d) for a filter stack of 95 plates spaced apart by 75 μm.

At 75 μm between the plates, the flow of water was established, but over a short period time it became unstable and flow finally terminated regardless of pressure applied to the fluid. Thus, fluid plugging of the spaces between the plates was sufficient to prevent any material flow, regardless of the pressure applied. FIG. 8 shows the results of flow tests through plates spaced apart by 75 μm. Ten pump trials were performed, each at idle, 25%, 50%, 75% and 100% throttle on a gas powered centrifugal pump. For the last trial it was not possible to establish a flow rate through the stacked plates, suggesting fluid blockage. Each of the ten trials is plotted in FIG. 8 and demonstrates the increasing pressure drop for a given flow rate, to the point where the pressure drop becomes unrelated to flow rate.

The pump trials have ten tests; each with five discrete pump rates each pump test and each pump rate taken in sequence. Yet the plot of pressure drop in FIGS. 7 and 8 demonstrate an increasing pressure drop for each rate and each pump test suggesting a development of a boundary layer or a cumulative effect of surface tension. FIG. 8 shows that once plugged, the plates exhibit no flow regardless of pressure applied to the outer edge of the plate.

The 'combined max throttle' curve 140 replots the 100% test data for each trial. The flow rates for the plates spaced apart by 75 μm are less than half of the flow rates for the 100 μm plates, yet the 75 μm plate stack has only 25% less hydraulic radius than the 100 μm plate stack, suggesting that rheological properties of the fluids, for example surface tension or viscosity, significantly influence fluid flow between plates that are closely-spaced apart.

In the case of the plates that were spaced apart by 75 μm, the pressure in the vessel fell off after pumping was stopped. Of note, it took 13 seconds to bleed down the water (an incompressible fluid) from a pressure of 500 kPa. This suggests that at this plate spacing, the space between the plates is substantially plugged by the water acting as the second fluid. Fluid flow transitioned from a viscosity-based flow regime to one dominated by surface tension. Flow cannot be established if the surface tension between the fluid and the plate is greater than the fluid pressure required to establish flow.

At 50 μm between the plates, water flow through the stacked plates could not be established. To verify that the spaces between the plates were in fact open and able to conduct a fluid, air was pumped through the plate separator and it was able to pass. This indicated that the spaces were plugging with water. However, air was able to flow through the plates spaced apart by 50 μm.

Both water and air were introduced through vessel inlet 14, and gas flowed out of vessel outlet 16, but it turned to mist flow as the test proceeded. The choke on discharge 18 needed to be adjusted to prevent air from exiting through 18. The presence of mist at vessel outlet 16 indicated that the air was carrying out some of the water, as it flowed along the spaces between the plates.

At 25 μm between the plates, no water could be pumped through the stacked plates. Pumping air through the stacked plates showed a considerably greater pressure drop than in the 50 μm plate stack. At this spacing, no misting at outlet 16 was observed, therefore the stacked plates were able to separate air and water, with water exiting through discharge 18.

Increasing the number of plates in the stack will reduce the overall pressure drop, however there is a practical limit to the number of plates that can be used since fluid plugging between at least some of the plates is part of the process. A balance is achieved with reduced pressure differential, overall low viscosity/surface tension flow and the number of plates that will remain fluid plugged.

These tests demonstrate that a tightly spaced plate assembly can separate fluids in a multiphase fluid provided the fluids have different rheological properties.

While the apparatus and method has been described in conjunction with the disclosed embodiments which are set forth in detail, it should be understood that this is by illustration only and the method and apparatus are not intended to be limited to these embodiments. On the contrary, this disclosure is intended to cover alternatives, modifications, and equivalents which will become apparent to those skilled in the art in view of this disclosure.

The invention claimed is:

1. A stacked-plate apparatus for separating a first fluid from a multiphase fluid that comprises the first fluid and a second fluid in an immiscible mixture, wherein the first fluid and the second fluid have different rheological properties, the apparatus comprising:

at least one pair of adjacent plates stacked along an axis, each plate of the pair of adjacent plates comprising a first edge and a second edge, said plates of the pair of adjacent plates having opposing surfaces that are parallel to one another and spaced apart axially to form a flow passageway for flow of fluid therethrough from a fluid inlet formed by adjacent first edges of the flow passageway to a fluid outlet formed by adjacent second edges of the flow passageway, wherein:
  said opposing surfaces of the pair of adjacent plates are spaced apart a distance such that, at a selected pressure:
    the first fluid of the multiphase fluid can flow into the fluid inlet, along the flow passageway and out of the fluid outlet; and
    the second fluid of the multiphase fluid cannot flow into the fluid inlet, along the flow passageway, and out of the fluid outlet.

2. The stacked plate apparatus of claim 1, wherein each plate of the pair of adjacent plates comprises a central opening forming the inner edge and an outer periphery forming the outer edge, and the fluid inlet is at the outer edges of the pair of adjacent plates and the fluid outlet is at the inner edges of the pair of adjacent plates.

3. The stacked plate apparatus of claim 1, wherein the first fluid is a gas and the second fluid is a liquid.

4. The stacked plate apparatus of claim 3, wherein the liquid is water.

5. The stacked plate apparatus of claim 3, wherein the distance is less than 50 μm.

6. The stacked plate apparatus of claim 3, wherein the distance is less than 25 μm.

7. The stacked plate apparatus of claim 1, wherein the first fluid is a liquid and the second fluid is a liquid.

8. The stacked plate apparatus of claim 7, wherein the first fluid is water.

9. The stacked plate apparatus of claim 8, wherein the second fluid is a hydrocarbon.

10. The stacked plate apparatus of claim 1, wherein
  each plate of the pair of adjacent plates comprises a central opening forming the inner edge and an outer periphery forming the outer edge, and the fluid inlet is at the outer edges of the pair of adjacent plates and the fluid outlet is at the inner edges of the pair of adjacent plates; and
  the first fluid is a gas and the second fluid is a liquid.

11. The stacked plate apparatus of claim 1, wherein
  each plate of the pair of adjacent plates comprises a central opening forming the inner edge and an outer periphery forming the outer edge, and the fluid inlet is at the outer edges of the pair of adjacent plates and the fluid outlet is at the inner edges of the pair of adjacent plates; and
  the first fluid is a liquid and the second fluid is a liquid.

12. The stacked plate apparatus of claim 1, wherein the viscosity of the second fluid is higher than the viscosity of the first fluid.

13. The stacked plate apparatus of claim 1, wherein the surface tension of the second fluid is higher than the surface tension of the first fluid.

14. The stacked-plate apparatus of claim 1, further comprising a vessel, wherein the stacked plate apparatus is inside the vessel and the vessel comprises:
  means for collecting the first fluid from the fluid outlet and delivering the first fluid to a first outlet of the vessel; and
  means for collecting the second fluid after the first fluid has been separated therefrom and delivering the second fluid to a second outlet of the vessel.

15. A method for separating a first fluid from a second fluid, wherein the first fluid and the second fluid are immiscible and in a multiphase fluid, the method comprising:
  in a pressurized vessel, spacing the opposing surfaces of at least one pair of adjacent plates a distance apart from one another to form a flow passageway therebetween for flow of fluid therethrough from a fluid inlet of the flow passageway to a fluid outlet of the flow passageway;
  delivering the multiphase fluid to the fluid inlet of the flow passageway;
  applying a pressure to the multiphase fluid in the vessel, and under said pressure:
    the first fluid flows along the flow passageway and out of the fluid outlet,
    the second fluid does not flow along the flow passageway and out of the fluid outlet;
  collecting the first fluid from the fluid outlet; and
  collecting the second fluid from about the fluid inlet.

16. The method of claim 15 further comprising collecting the second fluid at a bottom of the vessel.

17. The method of claim 15, wherein the first fluid is a gas and the second fluid is a liquid.

18. The method of claim 17, wherein the liquid is water.

19. The method of claim 18, wherein the second fluid is a hydrocarbon.

20. The method of claim 17, wherein the distance is less than 50 μm.

21. The method of claim 17, wherein the distance is less than 25 μm.

22. The method of claim 15, wherein the first fluid is a liquid and the second fluid is a liquid.

23. The method of claim 22, wherein the first fluid is water.

24. The method of claim 15, wherein the viscosity of the second fluid is higher than the viscosity of the first fluid.

25. The stacked plate apparatus of claim 15, wherein the surface tension of the second fluid is higher than the surface tension of the first fluid.

* * * * *